Dec. 29, 1936. M. E. MACKSOUD Re. 20,221

COMBINED AMPLIFYING AND RECTIFYING SYSTEM

Original Filed July 3, 1926 2 Sheets-Sheet 1

Inventor
Michel E. Macksoud.

By Clarence O'Brien
Attorney

Dec. 29, 1936. M. E. MACKSOUD Re. 20,221

COMBINED AMPLIFYING AND RECTIFYING SYSTEM

Original Filed July 3, 1926 2 Sheets-Sheet 2

Inventor
Michel E. Macksoud
By Clarence O'Brien
Attorney

Reissued Dec. 29, 1936 Re. 20,221

UNITED STATES PATENT OFFICE 20,221

COMBINED AMPLIFYING AND RECTIFYING SYSTEM

Michel E. Macksoud, St. Albans, N. Y., assignor to The Electron Corporation, East Orange, N. J., a corporation of New Jersey Original No. 1,920,576, dated August 1, 1933, Serial No. 120,376, July 3, 1926. Application for reissue July 24, 1935, Serial No. 32,900

16 Claims. (Cl. 250—27)

This invention relates to systems for amplifying and rectifying alternating, oscillating and variable currents independently and in combination, and is particularly adapted for use in conjunction with radiant energy systems and for adapting said systems to operate from power supply circuits generally used for city lighting purposes which may be either direct, pulsating, or alternating currents.

This invention comprehends the provision of an amplifying and rectifying system either independent of each other or combined for employing and operating a translating device forming the subject matter of the invention disclosed in the copending application bearing Serial Number 120,375 and filed July 3, 1926, now Patent No. 1,727,373.

The invention further comprehends the provision of circuit means for operation in conjunction with the four element tube disclosed in the copending application herein mentioned to amplify and rectify various oscillation frequencies such as are common to the transmission of intelligence by radiant energy, the reception and reproduction thereof, or the rectification of varying or oscillating currents used for power purposes in order to transform such currents for use in any desired manner together with means for controlling the potential and characteristics of the transformed current.

The invention further includes the provision of means associated in the four element tube with suitable associated circuit means adapted to increase the selectivity of the circuit means and translating device for desired oscillation frequencies, currents, or potentials, and for the separation and removal of undesirable currents and potential which are known to affect the efficient operation of devices and circuits of this character due to remote and uncontrollable sources.

A further object of the invention includes the provision of suitable cooperative circuits which are adapted to utilize the operation of a four element tube having a pair of electron emitting electrodes in which independent operations are performed in independent circuits associated with said electron emitting electrodes in order that more than one character of varying or alternating current may be amplified of rectified according to the results desired for use in any manner known in the art.

The invention comprehends numerous other objects and improvements in the method and manner of associating the circuits with translating devices particularly of the type disclosed in the copending application herein mentioned which are more particularly pointed out in the following description and in the claims directed to the preferred circuit structure or arrangement, it being understood, however, that numerous other methods and circuit connections may be made for employing the principles of this invention which are clearly within the scope of the invention as set forth and claimed herewith.

In the drawings forming part of this application:—

Figure 1 is a circuit diagram of a radiant energy receiving system employing the principles of this invention, wherein the translating devices are employed as a full wave power current rectifier in addition to their function as amplifiers and rectifiers for radio frequency oscillations, and in which suitable resistance control means is employed in conjunction with a filter for utilizing rectified power in the operation of the radiant energy system.

Fig. 2 is a wiring diagram of a system similar to Fig. 1, wherein the power from a suitable alternating or oscillating source has its potential varied by transformer means under suitable control which is rectified by the operation of the electron discharge devices employed in the operation of the radiant energy receiving system, and in conjunction with which suitable means is associated for discharging frequencies of an undesired character.

Figure 1:
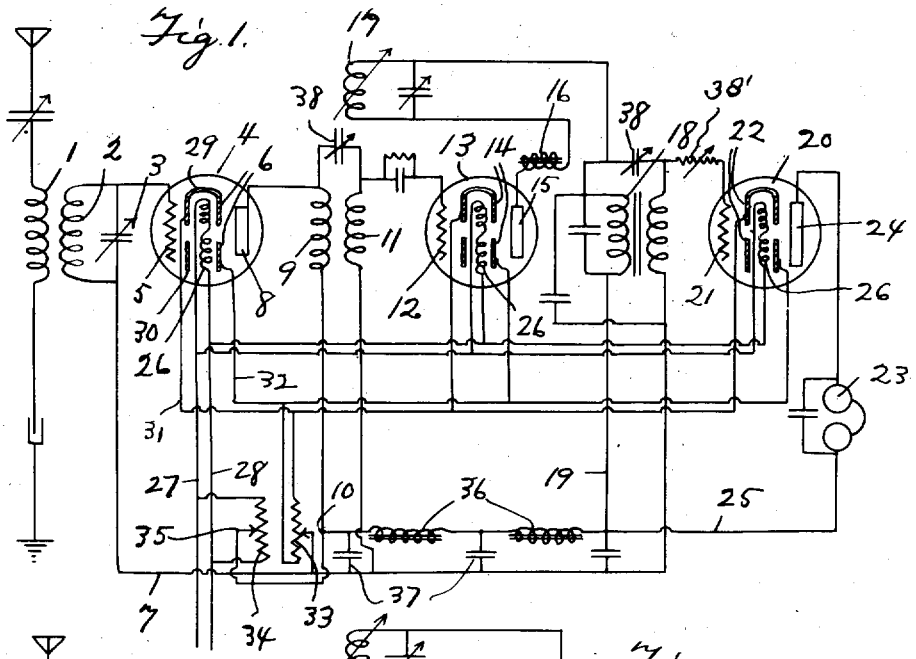

In Fig. 1, a suitable three circuit amplifying system is illustrated diagrammatically employing the improvements of the present invention and in which a suitable antenna circuit supplies the device 1 with energy which is impressed upon the circuit employing the devices 2 and 3 which are coupled with and form the input circuit for the translating device 4 having the terminals of the circuit electrically connected to the grid 5 and the return circuit of which is connected to the cathode 6 through the wire 7.

The plate 8 is connected with the output circuit including the device 9 which is impressed with a suitable potential of positive polarity from the wire connection 10. This is the usual form of amplifying circuit for radio frequency oscillation which may be of any well known type shown in the art, the circuit shown in Fig. 1, being for the purpose of illustration, and which transfers energy in the usual manner to the input circuit including the device 11 of the detector circuit which is connected with the grid 12 of the electron discharge device 13 while the return for the grid is connected with the wire 7 suitably connected with the cathode 14 of the tube or translating device 13.

The output circuit of the detector system has the anode 15 thereof electrically connected to the choke coil 16 and the feed back 17 which in turn is connected with the coupling device 18 and through the wire 19 receives a positive potential from the wire 10. For further amplification of the signals, there is shown in Fig. 1, an audio amplifying system including the translating device 20 having an input circuit connected with the coupling device 18, the grid 21 and the cathode 22, the same manner as is described in connection with the input circuit for the tube or translating devices 4 and 13 respectively. A suitable sound reproducing device 23 is included in the output circuit of the translating device 20 and having connection with the anode 24 thereof with the return circuit connected by the wire 25 to the circuit wire 10 for receiving the potential to be impressed on the anode 24.

A general circuit arrangement described above is common and well known in the art and includes associated circuits for amplifying radio frequencies, rectifying such amplified frequencies to produce audio frequencies and then amplifying the audio currents to reproduce a desired volume of sound transmitted or received by the system.

It is to be understood from this disclosure that the devices 4, 13 and 20 may therefore be used in any circuit combination for the various functions described and that the circuit illustrated is merely for the purpose of illustrating the various functions which the translating devices used in conjunction with this invention will perform. The translating devices 4, 13 and 20 are each of the four electrode type as disclosed in the copending application above mentioned, in which the cathode 6 may be formed by one or more sleeves or other forms of electrode structure adapted to be electron emitting when heated so that the receiving system described will operate in the usual and well known manner in the art with the cooperation between the cathode grid and anode of each of the translating devices, 13, 4 and 20.

This invention provides the independent electrode 26 in each of the devices 4, 13 and 20 which forms the fourth element of the tubes or devices in the form for most purposes of an electron emitting heating filament. This filament or heating means is independent of electrical connection with the cathode 6 except as will be hereafter pointed out in connection with the cooperation between these electrodes, and is constructed to be of a non-inductive character. The opposite terminals of the filament of the heating element 26 of each translating device is electrically connected to the opposite terminal of a power circuit including the wires 27 and 28 respectively. This power circuit may receive energy from any source preferably that used for lighting purposes in cities and the like which may be either alternating or direct current, as are now well known in the art. These heating elements 26 are constructed for operation preferably on circuits of this character and serve to heat the cathodes 6 sufficiently that they will produce an electron flow of desired intensity for the operation of the amplifying system.

In this operation of the amplifying system, the cathode 6 prevents electron discharge from the heating element 26 for the production of undesired current flow from this heating element, so that in the construction of the translating devices with the four elements illustrated, the fourth element or heating element is employed for the purpose of heating the cathode and adapting the tube or translating device for operation from alternating current power systems, as above described.

In the production of the device of this character, it is found that additional functions are obtained through the cooperation of the elements in the tube or translating device of which advantage is taken by this invention. This includes the cooperation between the heating element and the cathode 6 when the heating element or electrode is adapted to provide an electron emission which flows toward the cathode in which this electron emission is utilized with the heating element and cathode for rectifying the power of current for independent use in any desired manner. This invention in producing this result utilizes the rectification of the power currents for impressing the desired potentials in the amplifying system of the radiant energy receiving circuits above described.

With reference to Fig. 1, it will be noted that each of the cathodes 6 are formed with a pair of independent elements 29 and 30 respectively which are electrically connected by the wires 31 and 32 respectively with the opposite terminals of a potentiometer 33 while the third or movable terminal of the potentiometer is suitably connected with the wire 7 heretofore mentioned. A second potentiometer as illustrated in Fig. 1, is indicated in 34 having the stationary terminals thereof connected to the wires 27 and 28 while the adjustable contact point is connected to the wire 10 heretofore described. These wires 10 and 7 with the potentiometers 33 and 34 associated in the power circuit and with the cathode elements 29 and 30 respectively, form a circuit for utilizing the heating element 26 and the cathode 6 as a current rectifier in which the rectifier current is supplied to the circuit formed by the wires 10 and 7 between which a desired potential difference is obtained according to the adjustment of the movable contacts of the potentiometers, 33 and 34. In order to smooth out the ripples or variations in the rectified currents a suitable filtering system including the choke coil 36 and the filtering condensers 37 are interposed in circuit with the wires 10 and 7 in order that the rectified power will produce a substantially direct current supply at a desired potential. This potential is utilized to impress the anodes of the devices 4, 13 and 20 with the positive operating potential through connection of the anodes with the wire 10 as heretofore described.

Where a negative potential is desired in the input circuit to the several translating devices for impression on the grid, that this invention contemplates the provision of suitable grid bias producing capacities 38 as clearly shown in Fig. 1, in which the plates of the capacities are connected respectively with the output circuit and the input circuit of two adjacent successive amplifying or detecting stages. In view of the positive potential impressed in the output circuit of each system for the operation of the anode therein, it is to be understood that the terminal of the capacity connected with this circuit will have a positive polarity and as the other terminals of the capacity must necessarily have a negative polarity equal and opposite to the positive polarity impressed, the grids of the input circuits so connected with these capacities 38 will be impressed with a desired grid bias controlled by high resistance 38' in order to insure the efficient operation of the amplifying system.

From the above description in connection with the circuit shown in Fig. 1, that there are three independent circuits functioning in a manner to produce cooperation and a single result in a highly efficient manner in which any form of a radiant energy receiving system is operated by a source of power independent of the system of any desired character such as house lighting power supply systems used in cities and that a third circuit operates in conjunction with these two systems to supply rectified power for the operation for the receiving system in which the translating devices are operated by the power from the power circuit under the control of which the amplifying and rectifying operations of the circuits and the devices is effected.

Under some conditions, it may be found desirable to use transformer couplings for increasing the potential in the circuit utilizing the rectified current from the cathode and heating element of the translating devices instead of the resistance couplings through the use of the potentiometers 33 and 34 as shown in Fig. 1. For this purpose, reference is made to Fig. 2, which shows a circuit similar to that in Fig. 1, in substantially all respects but in which the potentiometers are replaced by a transformer 39 having the opposite ends of the primary 40 connected to the power circuit wires 41 and 42 respectively, while the secondary 43 is connected to the rectified current circuit wires 44 and 45 respectively. The circuit wires 44 and 45 correspond respectively with the wires 7 and 10 of Fig. 1, and are connected to the movable contacts 46 of a pair of potentiometers 47 and 48 respectively which serve as a controlling means for the potentials across the transformer terminals. Capacities 49 are interposed in the circuits across the terminals of the transformer primary and secondary winding to have a primary filtering operation on the rectified current in order to reduce the ripple effect therein.

Suitable filtering choke coils 50 and condensers 51 are connected in circuit in the manner shown between the wires 44 and 45, the same as in the circuit diagram of Fig. 1.

Figure 2:
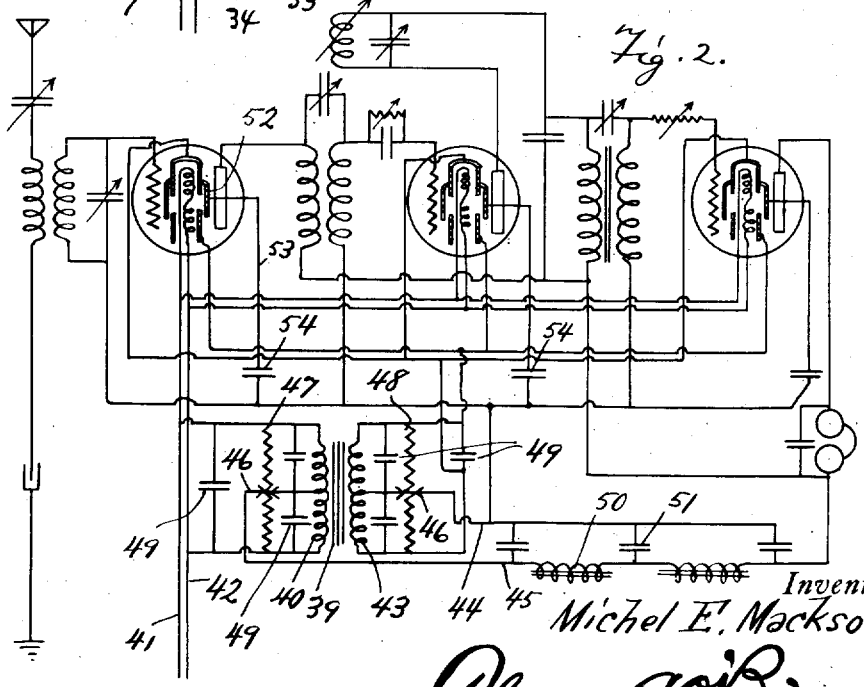

The circuit shown in Fig. 2 includes a shielding element 52 in each of the translating devices which is electrically connected by the circuits 53 to the grid return circuit of the devices through the capacities 54. This shielding circuit forms a means of discharging undesired currents in the system for the purpose of preventing any possibility of the hum caused by alternating currents as well as for discharging static charges commonly received in amplifying systems. This shielding circuit will therefore, as illustrated in Fig. 2, further increase the advantageous results produced by the filtering circuit so as to reduce the tendency of reproduction of undesired sound.

Figure 3:
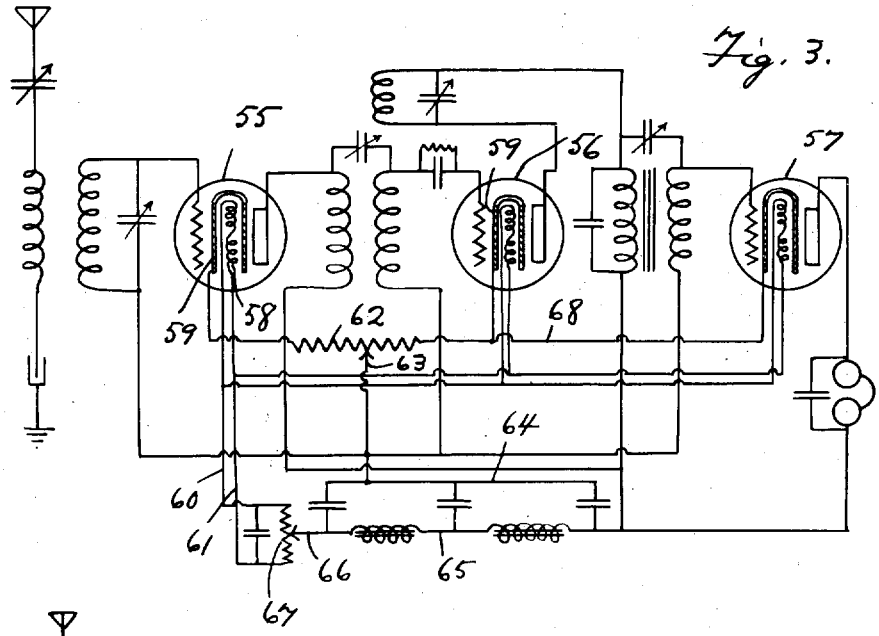
Fig. 3 is a wiring diagram of a radiant energy system using electron translating devices constructed to provide half wave rectifiers for power currents and suitable circuit means employing two or more such devices for rectifying the full wave of the power current.

Referring to Fig. 3, a system is illustrated utilizing the three types of circuit for receiving radio energy with three translating devices indicated at 55, 56, and 57 respectively, which are of the four element type including the heating element 58 and the cathodes 59 in which the cathodes are constructed in a single section as illustrated instead of two sections as shown in Fig. 1.

These translating devices shown in Fig. 3, form half wave rectifiers through the cooperation of the cathode and the heating element of each device and in the circuit arrangement shown, two of these devices particularly 55 and 56 respectively, are used for rectifying each half wave of an alternating power supply from the wires 60 and 61 which is effected through the connection of the cathodes 59 of the devices 55 and 56 with the opposite stationary terminals of the potentiometer 62 while the movable contact 63 is connected with one circuit wire 64 of the filter and rectified current circuit.

The other circuit wire 65 of the rectifier current circuit is electrically connected to the movable contact 66 of the potentiometer 67 having the stationary terminals thereof electrically connected with the power wires 61 and 60 as illustrated. The device 57 has the cathodes thereof electrically connected through the wire 68 with the cathode 59 so that it also cooperates with the device 56 in the rectification of one-half of the current waves. In other respects the circuit connection and the operation thereof is the same as shown in Fig. 1, the circuit in Fig. 3 illustrating a method of using half wave rectifiers for full wave rectification of a power current supply of the character above mentioned to secure the operation of an amplifying system for radiant energy and in which the rectified current is used to provide the source of potential which is impressed in the plate circuit of each of the translating devices as shown.

Figure 4:
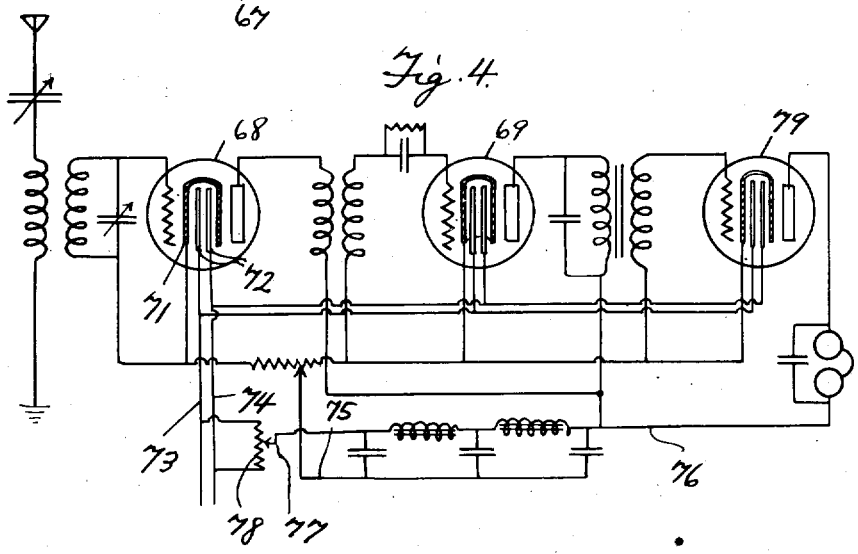
Fig. 4 is a wiring diagram illustrating the employment of translating devices utilizing gas filled envelopes or tubes as distinguished from evacuated containers contemplated by the circuits illustrated in Figs. 1 to 3.

The translating devices for use with the circuit arrangements as above set forth have been principally those which the elements contain in a high vacuum type of tube, and it has been found and is within the scope of this invention through operation of circuits of the above type, with a gas filled translating device, and for this purpose reference is made to Fig. 4, illustrating diagrammatically the circuit arrangements of an amplifying circuit for gas filled tubes which are indicated at 68, 69 and 70, respectively. A three circuit type of amplifier of simple construction is illustrated, in which the cathode of each tube is indicated at 71 which is electron emitting as in the case of the cathode used in the tubes above mentioned and function in the manner described.

The heating elements in the gas filled tubes comprise the use of a pair of plates 72 which are mounted in spaced relation within the sleeve-like cathode 71 which may be constructed in the manner as illustrated in my copending application above mentioned.

Similar plates 72 of each pair are connected to the same circuit wire so that one plate of each pair 72 in each translating device is connected to the opposite terminal of a source of power supplied through the wires 73 and 74 respectively, which is preferably of an alternating character.

As a result, the charge is maintained on the plate 72 and the conductivity of the gas between the plates provides a heating thereof in the presence of the gas which is transmitted to the cathode 71 for providing the proper temperature of the cathode for the electron emitting functions thereof.

The cathodes 71 are interconnected as illustrated in Fig. 4, with one side of the rectified current potential supply 75 while the opposite circuit wire 76 receives the connections from the plates of the translating devices in the usual manner, with suitable filtering means as above described interposed between the wires 75 and 76. The wire 76 is connected with the movable contact 77 of the potentiometer 78, the terminals of which are connected across the power circuit wires 73 and 74 as illustrated.

It should be understood from this description that in each of the circuit arrangements shown, a three circuit system has been illustrated for the purposes of showing the method of employing the electron discharge devices in radio frequency amplifying circuits, the detecting circuits, and audio frequency amplifying circuits. While this character of an amplifying system is disclosed, it is to be understood that this invention is not limited to these particular forms of circuits but may be employed with any form of receiving or transmitting circuit for radiant energy or any other circuit or system employing translating devices of this character for functioning in the well known manner in which the three element tube common in the art is now used. It should thereby be apparent that this invention comprehends the provision of a four element tube having a cathode and a heating element provided for special cooperation in order to provide a triple function, first, the operation of receiving or transmitting systems including amplification of both audio and radio frequencies as well as rectification between these frequencies and the second, the operation of the system from the now generally known and employed power circuit for house lighting purposes as used in big cities on either direct current or alternating potential instead of requiring the use of specially constructed storage battery systems with charges operating on low voltage or potentials or from suitable devices known in the art as eliminators which are now used for reducing the potential of the power circuit mentioned and providing the type of current normally supplied by secondary batteries as above suggested; and third, the provision of an independent system of current rectification between the heating electrode and the cathode in which the cathode functions as an anode in view of the electron flow from the heating element toward the cathode so that the power from the city power circuits as above described may be rectified to produce the proper character of energy and potential for the efficient operation of radiant energy systems or other electrical systems of a similar character now used in the art.

In addition, a new principle is employed in obtaining a negative grid bias in the input circuits of electron discharge devices through the use of capacities as indicated at 38 in Fig. 1, which may be used to replace the usual biasing battery for the purpose of impressing this negative potential on the grid of these devices.

In place of the potentiometer control of Fig. 1, it is to be understood that a fixed resistance or resistances or a plurality of variable resistances may be substituted in providing a resistance coupled circuit as distinguished from an inductively coupled circuit.

Having thus described my invention, what I claim as new is:

1. In a rectifying and amplifying circuit the combination comprising an audion having grid and plate electrodes, a two part cathode emitter and a heater for said emitter, said heater being adapted to be connected directly to a source of alternating current, an input circuit including said grid and emitter, and an output circuit including said plate and emitter, said two part emitter and said heater cooperating to effect full wave rectification of the alternating current which is impressed on said plate.

2. In a rectifying and amplifying circuit the combination comprising an audion having grid and plate electrodes, a two part cathode emitter and a heater for said emitter, said heater being adapted to be connected directly to a source of alternating current, a high resistance connected across said heater, an input circuit including said grid which is connected to the approximate center of said resistance, a connection between the two parts of the emitter including a high resistance and an output circuit including a connection from the plate to the approximate center of said second resistance, whereby the alternating current is fully rectified and applied to said plate.

3. An amplifying and rectifying circuit comprising at least one audion having a grid, a plate and a two-part cathode emitter comprising adjacent sleeves, a third sleeve surrounding the adjacent ends of said two sleeves, a heater for the emitter, an alternating current circuit connected directly to said heater, a resistance connected across said heater, a connection from the resistance to the plate, and a connection from the third sleeve to the grid.

4. The combination comprising a variable current amplifying system including an audion having a two-part cathode emitter, a heater for said emitter, a grid and plate, an impedance connected across said heater, an impedance connected across the two-part emitter, an input circuit connected to the grid and the impedance across the two-part emitter, an output circuit connected between the plate and the impedance connected across the heater, and a filter system connected to the impedances whereby the grid bias potential is provided from the potential in the plate circuit.

5. The combination with a variable current amplifying system including an audion having a two-part cathode emitter, a heater for said emitter, a grid and plate, an input circuit including said grid and an output circuit including said plate, of rectifying means energized from an alternating current source and connected to the grid and plate circuits for supplying a plate potential and a grid biasing potential.

6. In a rectifying and amplifying apparatus the combination comprising an audion having grid and plate electrodes, a cathode emitter having two distinct emitting areas and a heater for said emitter, said heater being adapted to be directly connected to an alternating current source, an input circuit including said grid and emitter, and output circuit including said plate and emitter, and means connected to said emitter areas, said heater and said input and output circuits to form a full wave rectifier of alternating current for supplying the grid and plate operating potentials.

7. In a rectifying and amplifying apparatus the combination comprising an audion having grid and plate electrodes, a cathode emitter having two distinct emitting areas and a heater for said emitter, said heater being adapted to be directly connected to a direct or alternating current circuit for energization thereof, rectifying means, including and connected to said heater and emitter areas, energized when the heater is connected to an alternating current source, an input circuit including the grid connected to said rectifying means and an output circuit including said plate connected to said rectifying means whereby the grid and plate operating potentials are supplied thereto, the heater being energized and the grid and plate operating potential being supplied when the heater is connected to a direct current source.

8. An amplifying and rectifying apparatus comprising an audion having a grid and a plate, a cathode emitter having two distinct emitting areas, a heater for said cathode emitter, an alternating current circuit connected to said heater, rectifying means including and connected to said emitting areas and said heater, an input circuit including said grid, an output circuit including said plate, and connections from the rectifying means to said grid and plate circuits to provide grid and plate operating potentials.

9. An amplifying and rectifying apparatus comprising an audion having a grid and a plate, a cathode emitter having two distinct emitting areas, a heater for said cathode emitter, an alternating current circuit connected to said heater, rectifying means including and connected to said emitting areas and said heater, an input circuit including said grid, an output circuit including said plate, connections from the rectifying means to said grid and plate circuits to provide grid and plate operating potentials, and another electrode adjacent said emitter and connected to said grid circuit.

10. Circuit means comprising an audion having a cathode emitter including two emitting areas, a heater for said emitter, a grid and a plate, an input circuit including said grid, an output circuit including said plate, alternating current rectifying means including and connected to said emitter and heater and connections from the rectifying means connected to the input and output circuits for supplying operating potentials therefor.

11. A combined rectifying and amplifying system operable from an alternating current circuit including an audion having a grid, a plate and a cathode having two emitting surfaces, a heater for said cathode, an energizing circuit for said heater, rectifying means including said emitting surfaces and connected to said circuit, and connections from the rectifying means to said grid and plate for supplying operating potentials thereto.

12. A combined rectifying and amplifying system operable from an alternating current circuit including an audion having a grid, a plate and a cathode having two emitting surfaces, a heater for said cathode, an energizing circuit for said heater, rectifying means including said emitting surfaces and connected to said circuit, connections from the rectifying means to said grid and plate for supplying operating potentials thereto, and an electrode adjacent said cathode and connected to said grid.

13. A circuit including an audion having a grid, a plate, and a cathode, a heater for said cathode, said cathode comprising two emitting elements adjacent said heater, an input circuit including said grid, an output circuit including said plate, an impedance connected between said emitting elements, and a connection from said impedance to said input circuit.

14. A circuit including an audion having a grid, a plate, and a cathode, a heater for said cathode, said cathode comprising two emitting areas adjacent said heater, an input circuit including said grid, an output circuit including said plate, an impedance connected between said emitting areas, a connection from said impedance to said input circuit, an auxiliary electrode adjacent said cathode, and a connection from said auxiliary electrode to said input circuit.

15. A circuit comprising an audion having a grid, a plate, and a cathode having two emitting elements, a heater for said cathode, an input circuit including said grid and cathode, an output circuit including said plate and cathode, circuit means for energizing said heater with alternating current to activate the cathode, means for impressing operating potentials on the input and output circuits, and means for discharging undesired currents in the system for the purpose of preventing hum caused by alternating current energization comprising an auxiliary electrode adjacent said cathode and interposed in the electron stream between the cathode and plate and a connection from said auxiliary electrode to said grid circuit.

16. A circuit comprising an audion having a grid, a plate, and a two part cathode, a heater for said cathode, an input circuit including said grid and cathode, an output circuit including said plate and cathode, circuit means for energizing said heater with alternating current to activate the cathode, means for impressing operating potentials on the input and output circuits, and means for by-passing static charges comprising an auxiliary electrode adjacent said cathode and interposed in the electron stream between the cathode and plate, and a connection from said auxiliary electrode to said grid circuit.

MICHEL E. MACKSOUD.